United States Patent
Sharma (10) Patent No.: US 7,463,011 B2
(45) Date of Patent: Dec. 9, 2008

(54) SWITCHING REGULATOR WITH ANALOG OR DIGITAL CONTROL

(75) Inventor: Anmol Sharma, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 619 days.

(21) Appl. No.: 10/907,527

(22) Filed: Apr. 5, 2005

(65) Prior Publication Data

US 2006/0186866 A1    Aug. 24, 2006

(30) Foreign Application Priority Data

Feb. 22, 2005   (IN)   .......................... 147/CHE/2005

(51) Int. Cl.
   *G05F 1/00* (2006.01)
(52) U.S. Cl. ...................... 323/283; 323/285
(58) Field of Classification Search ................. 323/283, 323/285, 286, 271, 284
   See application file for complete search history.

(56) References Cited

U.S. PATENT DOCUMENTS

| | | | | |
|---|---|---|---|---|
| 5,594,631 A | * | 1/1997 | Katoozi et al. | ................. 363/41 |
| 6,194,883 B1 | * | 2/2001 | Shimamori | ................. 323/283 |
| 6,933,711 B2 | * | 8/2005 | Sutardja et al. | ............. 323/283 |
| 7,057,907 B2 | * | 6/2006 | Oh | ........................... 363/21.05 |
| 7,148,669 B2 | * | 12/2006 | Maksimovic et al. | ....... 323/283 |
| 2006/0043954 A1 | * | 3/2006 | Markowski | ................. 323/283 |

* cited by examiner

*Primary Examiner*—Shawn Riley
(74) *Attorney, Agent, or Firm*—Steven A. Shaw; W. James Brady; Frederick J. Telecky, Jr.

(57) ABSTRACT

A switching regulator provided according to an aspect of the present invention contains uses one or more error samples from prior iterations, in addition to an error sample of the present iteration, to determine the correction for the present iteration. Due to the use of multiple samples, a switching regulator may provide a regulated signal which is at least substantially constant even in the presence of line/load variations. A controller determining the correction can be implemented either in analog or digital domain.

10 Claims, 5 Drawing Sheets

SWITCHING REGULATOR WITH ANALOG OR DIGITAL CONTROL

BACKGROUND OF THE INVENTION

1. Field of the Invention

The present invention relates to the field of design of electronic circuits, and more specifically to a method and apparatus for reducing line/load regulation problems in switching regulators.

2. Related Art

Regulators generally refer to components which receive a potentially varying voltage or current signal (unregulated signal) as input and generate constant voltage or current signals ("regulated signal") as output to other components of a system. Such regulated signals are generally required as input signals for the operation of such other components.

Switching regulators are a type of regulators which generate regulated signals by operating switches on and off. In general, in switching regulators, the strength of the generated regulated signals is controlled by turning various switches on and off, and thus the desired constant strength of regulated signal is achieved by controlling the duration of on state and duration of off state of the switches.

One recognized problem with generating regulated signal is that the strength of the regulated signal may not remain at desired constant strength under various operating conditions and the resulting changes may affect accurate performance of various components operating using the regulated signal.

One of the operating conditions that causes changes in the desired constant strength of the regulated signal is the variations in un-regulated signals provided as an input to the switching regulators. A parameter "line regulation" generally provides a measure of such variation and may be computed as the ratio of change in output signal for a corresponding change in input signal. Ideally, the line regulation value needs to equal 0.

Another operating condition that causes changes in the desired constant strength of the regulated signal is the variations in the load (power drawn by the components receiving the regulated signal as input). A parameter "load regulation" provides a measure of such variation and may be computed as the ratio of change in output signal due to corresponding change in the load. Again, the load regulation value also ideally needs to equal 0.

It is generally desirable that the regulated signal have a pre-specified (desired) strength for accurate performance of various components. What is therefore needed is a switching regulator providing a regulated signal having desired constant strength (voltage or current) while meeting at least some of the operating conditions noted above.

DETAILED DESCRIPTION

1. Overview

A switching regulator provided according to an aspect of the present invention contains a controller, which receives error values representing errors (difference proportional to the present output value and desired output value) and generates a control parameter based on previous and present error values. Control parameter operates the switches which in turn control the strength of the output signal. Due to the computation of the control parameter based on previous and present error signal, several advantages such as attaining a regulated signal which is independent of load/line regulation problems, are obtained.

In one embodiment, the controller is implemented in digital domain in which error values are digitized and stored in memory. Digitized error values are compared and computation of control parameters are performed in digital domain. By Implementing in digital domain various advantages such as flexibility in computation of control parameters are obtained. In an alternative embodiment, the controller is implemented in analog domain, in which error value is stored in analog storage device and compare in analog domain.

Various aspects of the present invention will be clearer in comparison to a prior system in which at least some features of the present invention are not implemented. Accordingly, the details of such a prior system are described below first.

2. Example Prior Switching Regulator

Figure 1:
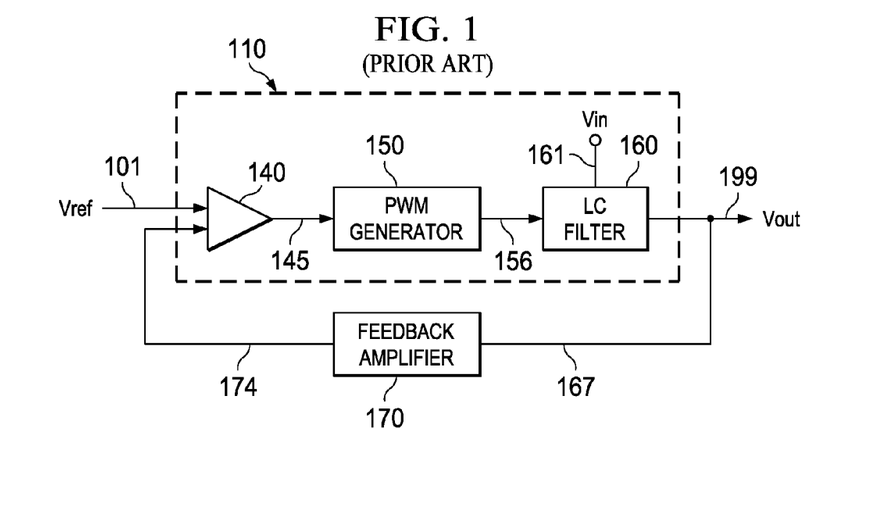
FIG. 1 is a block diagram illustrating the principles of operation of a prior switching regulator.

FIG. 1 is a block diagram illustrating the details of an example prior switching regulator. The regulator there is shown containing error amplifier 140, PWM generator 150, LC filter 160 and feedback amplifier 170. Each component is described below in further detail.

Feedback amplifier 170 receives present output signal and amplifies the received signal to achieve a closed loop gain of unity thereby provides stability to the system. Error amplifier 140 receives a reference signal (representing the desired constant output signals) on one of the inputs, and output (representing the present output signal) of feedback amplifier 170 as the second input. Error amplifier 140 generates a error signal on path 145 corresponding to the difference of strength in the received two inputs.

PWM generator 150 generates (on path 156) a control signal in the form of current (in a 'current mode' of operation) or voltage ('voltage mode' of operation). The control signal is eventually represented in the form of a duty cycle (d), which is proportionate to the strength of the error signal.

LC filter block 160 (example of an impedance network) typically contain a LC network and switches operated at the duty cycle (d). The switches generate a switched input signal having an amplitude equal to input signal (Vin on path 161), but with the duty cycle d. The LC network receives the switched input signal and generates a constant voltage or current equaling (in proportion to) the average value of the switched input signal. The reference signal and the components of regulator of FIG. 1 are designed to ensure that the average value of the switched input signal corresponds to the strength of the desired regulated signal.

Hence, in the switched regulator of FIG. 1, the output voltage or current has a relation with magnitude of input signal and duty cycle as:

$$Vout=d*Vin$$

wherein Vout represent strength (voltage in this case) of constant signal, d represents duty cycle at which switches are operating, and Vin represents the magnitude (voltage) of the input signal.

In operation, LC filter block 160 receives an unregulated input signal 161 and a control signal with a duty cycle 'd' from PWM generator 150 on path 156. Switches contained in LC filter generates a switched input signal with duty cycle 'd'. LC network filters the switched input signal to provide a constant signal with the desired strength as output on path 199 in the steady state.

The output of LC filter block 160 is compared with Vref to generate an error signal in each loop iteration, and the duty cycle is generated from the error signal for that iteration. The error generated in the present iteration is then used to generate the duty cycle for the next iteration. The output signal 190 is corrected until a desired constant level is reached.

The following analysis helps in further understanding the principles of operation, as well as the disadvantages of the prior embodiment.

Portion 110 (containing error amplifier 140, PWM generator 150, and LC filter 160) of FIG. 1 can be viewed as a system with gain A (gain A equaling cascaded gain A1 of error amplifier 140, and A2 of PWM generator 150 and LC filter 160). Portion 110 receives an error signal (potential difference across the two input terminals) having strength 'e' and generates an output signal Vout=A*e, wherein * represents a multiplication operation.

Switching regulator of FIG. 1 generates output signal Vout (in case of voltage regulator) equal to Vref when gain of the feed back amplifier 170 equal to 1. However from the above, it is apparent that to generate an output signal having a desired constant value, a non-zero duty cycle is required. Non zero duty cycle corresponds to a nonzero 'e' (as duty cycle is function of error) resulting in Vout=Vref(+/−)e.

To maintain a constant Vout even in the face of changes in Input (line voltage) or load (load current), duty cycle requires to be changed. However change in duty cycle implies a change in value 'e' by same proportion causing Vout to be different from the desired constant value, which in turn results in line and load regulation problem. However a small value of e may provide relatively more constant output signal.

Such need implies that for system to support a negligible small error, the gain of portion 110 needs to be very high. However achieving high gain may pose design challenges and lead to instability of the system.

Further, as noted in the above description, the error value of a present iteration is used to generate the duty cycle (or other signals controlling the correction) for the next iteration, and the duty cycle in turn determines the strength of the signal provided on path 199. To generate the signal on path 199 with the desired strength, the duty cycle may also need to be positive. This requirement in turn may mean that the error cannot equal 0. However, the loop operation is generally designed to minimize the error value. Due to the conflicting requirements (error cannot equal 0 and minimizing error), the output signal on path 199 may vary by small value even in the steady state. Such varying may be undesirable, and it is generally desirable that the output on path 199 equal a desired constant strength.

Various aspect of present invention overcome at least some of the limitation described above. Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

3. Invention

Figure 2:
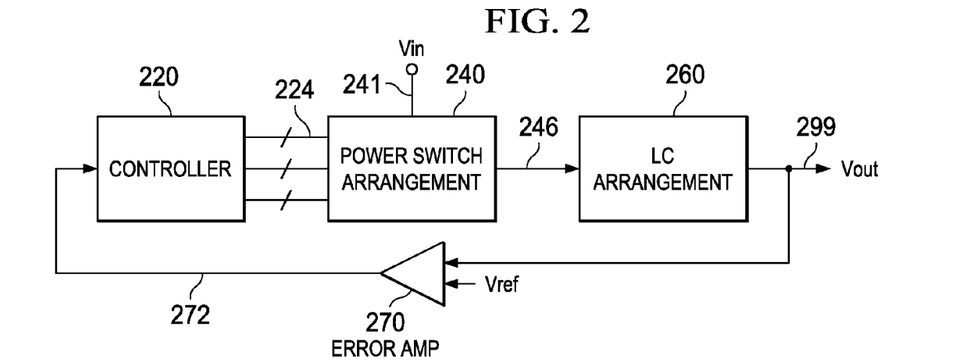
FIG. 2 is a block diagram illustrating the details of a switching regulator provided according to an aspect of the present invention.

FIG. 2 is a block diagram illustrating the details of a switching regulator in an embodiment of the present invention. The block diagram is shown containing controller 220, power switch arrangement 240, LC arrangement 260, and error amplifier 270. Each component is described below in further detail.

Power switch arrangement 240 receives control signals on path 224 (from controller 220) and unregulated input signal 210 on path 241. Various switches in power switch arrangement 240 are turned on and turned off for different time duration based on the control signal received on path 224, thereby generating a switched input signal from unregulated input signal 241. The generated switched input signal is presented on path 246.

LC arrangement 260 receives the switched input signal on path 246, and operates to store and discharge energy on LC components (energy storage element) to generate a regulated signal having a desired strength. The regulated signal is provided on path 299, as shown. The details on an example embodiment of LC arrangement 260 are provided in sections below. The combination of power switch arrangement 240 and LC arrangement 260 represents an example circuit which generates a regulated output signal based on the control signals received on path 224.

Error amplifier 270 receives the input a reference signal representing the strength of a desired constant output signals and the output generated by LC filter (present output signal) on path 299, and generates an error signal corresponding to the difference of strength in the received two inputs. The error signal is provided on path 278.

Controller 220 generates a control parameter in each iteration based on the error values corresponding to present and prior iterations. Control parameter represents a duty cycle in a voltage mode control, and a reference current (which in turn determines the duty cycle)in current mode control switching regulator in the embodiments described below.

Due to the use of multiple error values, the control parameter can be generated accurately, thereby attaining a superior regulated signal on path 299. This control parameter sets target for reference current for the next (coming) clock cycle, and hence determines the specific switch arrangement for the next cycle. The commands for the switch arrangement are sent on path 224 in FIG. 2 in the form of control signals. The operation of an example embodiment of controller 220 is described below with respect to FIG. 3.

4. Flow Chart

Figure 3:
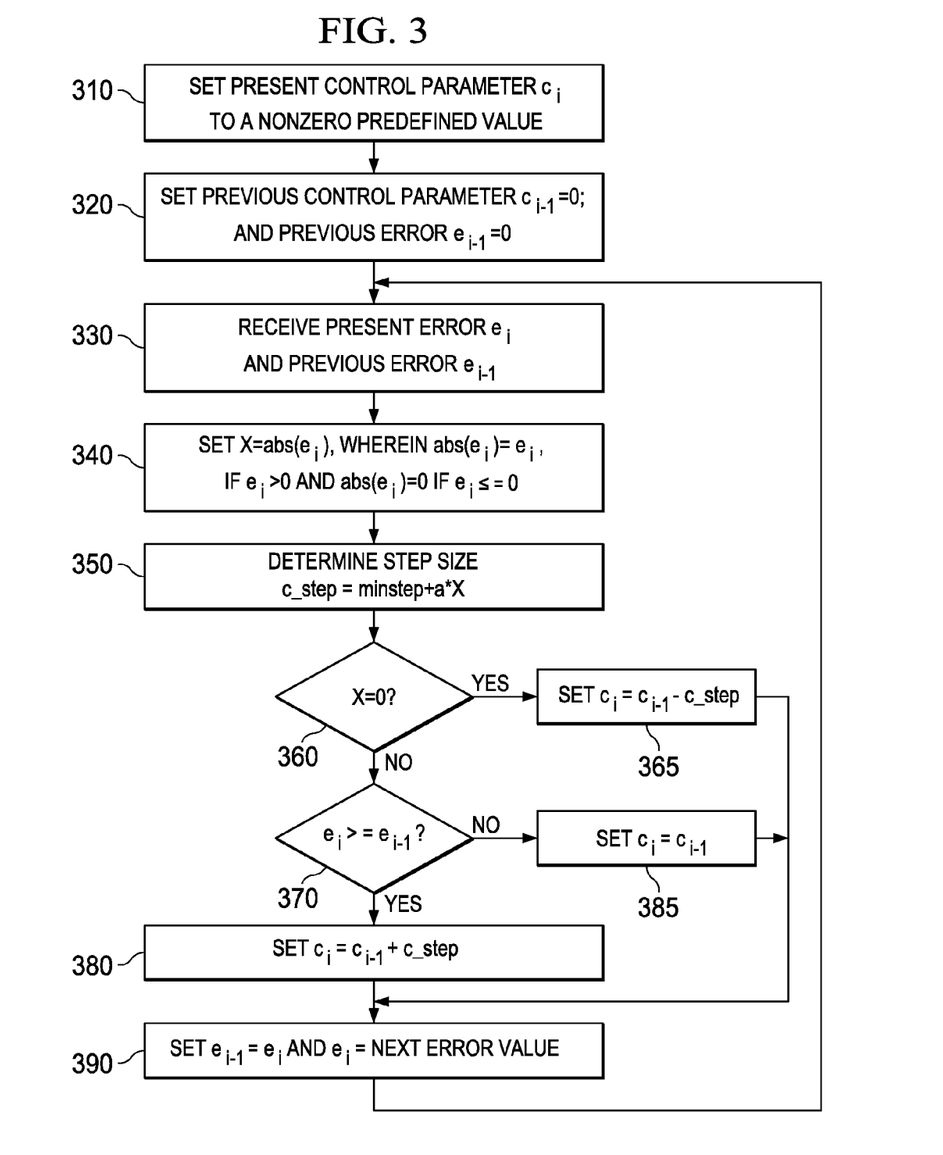
FIG. 3 is a flow chart illustrating the operation of a controller provided in a switching regulator, according to an aspect of the present invention.

FIG. 3 is a flowchart illustrating the operation of a controller in one embodiment. The flowchart is described with respect to FIG. 2 for illustration. However, the features can be used in other environments/devices as well. The flowchart begins in step 301, in which control immediately passes to step 310.

In step 310, controller 220 sets present control parameter $c_i$ to a nonzero predefined value (an initial value). Initial value of $c_i$ can be determined from the knowledge of expected values of unregulated input signal, required regulated output signal, etc. It should be appreciated that i is used as a subscript to denote values for a 'present iteration', and thus variables with a subscript of 'i-1' contain values for a previous iteration.

In step 320, controller 220 sets the previous control parameter $c_{i-1}$ to 0, and the previous error value $e_{i-1}$ to 0. These variables are set prior to entering the loop of steps 330-390, described below.

In step 330, controller 220 receives present error value $e_i$ and previous error value $e_{i-1}$. Present error value is received from comparator 270 and previous error signal is received from a memory unit used for storing error value.

In step 340, controller 220 sets a temporary variable X to pos(ei), wherein pos($e_i$) equals ei if $e_i$>0, and 0 otherwise. In step 350, controller 220 determines the step size c_step as equaling (minstep+a*X), wherein minstep represents a minimum step size, 'a' represents a constant value and * represents multiplication operation. Step size represents a value by which the control parameter is incremented or decremented in each cycle of iteration, as described below.

In step 360, controller 220 determines whether X equals 0. X would equal 0 either if the output is at a desired strength or if the error is negative, implying that the output voltage on path 499 exceeds the desired value. Control passes to step 365 if X equals 0 and to step 370 otherwise.

In step 365, controller 220 decrements the control parameter $c_i$ by c_step (determined in step 350). As a result, the voltage level on path 499 is reduced in the next iteration. Control then passes to step 390.

In step 370, controller 220 compares the present error value ($e_i$) with the previous error value ($e_{i-1}$). Control passes to step 380 if $e_i$ greater than or equal to $e_{i-1}$, and to step 385 otherwise. In step 380, controller 220 increments the control parameter by c_step, computed in step 350. Control then passes to step 390.

In step 385, controller 220 maintains the same control parameter. In other words, when the error decreases compared to a previous iteration, the control parameter is not changed (under the assumption the correction is in the right direction) control then passes to 390. In step 390, controller 220 sets $e_{i-1}$ equal to $e_i$, and $e_i$ is set to the next error value. Control then transfers to step 330 for the next iteration.

From the above, it may be appreciated that control parameter is adjusted (incremented or decrement) based on a prior sample and a present sample iteratively until the present error signal reaches a value equaling zero.

Further, it may be noted that the control parameter is not necessarily a function of error signal (as present and previous error values are used), and thus can be set to any value required to maintain the regulated output signal at a desired value. For example, given a zero value for error $e_i$, one can have finite value of control parameter to keep the regulated out put at the desired value. Thus, some of the disadvantages noted above with respect to FIG. 1 are overcome.

It should be appreciated that various embodiments can be implemented consistent with the approaches described above. The description is continued with respect to an embodiment in which controller 220 computes the control parameter in digital domain.

5. Digital Domain Implementation

Figure 4:
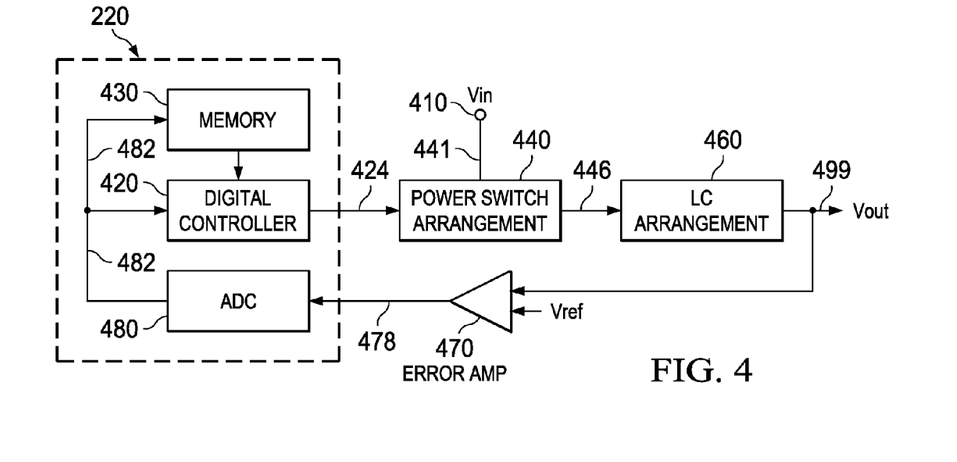
FIG. 4 is a block diagram illustrating the details of an example implementation of a controller in digital domain.

FIG. 4 is a block diagram illustrating the details of a switching regulator in an embodiment in which a controller is implemented in digital domain. The block diagram is shown containing digital controller 420, memory 430, power switch arrangement 440, LC arrangement 460, error amplifier 470, and analog to digital converter (ADC) 480. Each component is described below in further detail Power switch arrangement 440 receives control signal on path 424 (from digital controller 420) and unregulated input signal 410 on path 441, and generates a switched input signal with duty cycle as specified by digital control signal and having amplitude of unregulated input signal. The generated switched input signal is presented on path 446.

LC arrangement 460 receives the switched input signal on path 446, and operates to store and discharge energy on LC components (energy storage element) to generate a regulated signal having desired strength. The regulated signal is provided on path 499, as shown. The details on an example embodiment of the combination of power switch arrangement 440 and LC arrangement 460 is provided in sections below. The combination of power switch arrangement 440 and LC arrangement 460 represents an example circuit which generates a regulated output signal based on the parameter values received on path 424.

Error amplifier 470 receives a reference signal representing the strength of a desired constant output signals and the output generated by LC filter (present output signal) on path 499, and generates an error signal corresponding to the difference of strengths in the received two inputs. The error signal is provided on path 478.

Digital controller 420, ADC 480 and memory 430 together represent controller 220 in one embodiment. ADC 480 digitizes the received error signal to desired number of bits (resolution). The digital values are presented on path 482. Memory unit 430 stores digital values representing error signals (received on path 482). Size of the memory unit can be decided based on the number of previous error signal used to generate a digital control signal (described below). In an embodiment described above with respect to FIG. 3, only a single digital value is stored.

Digital controller 420 generates a control parameter in each iteration based on the digital values (corresponding to prior iterations) in memory unit 430 and the digitized error signal received on path 482. It may be appreciated that the control parameter can be adjusted (incremented or decrement) until the present error signal reaches a value equaling zero (typically resolution of ADC determines lowest value of error the system can support). Due to the processing of the inputs in digital domain, digital controller 420 may be designed with substantial control in generating the control signals.

The control parameter generally needs to be consistent with the interface requirements of power switch arrangement 440. In an embodiment described below, control parameter represents a duty cycle (in voltage mode control) or a signal having a reference strength for making the required correction (in current mode control) in the embodiments described below. An example implementation of digital controller 420 in a current controlled regulator is illustrated below with the help of block diagram.

6. Current Controlled Regulator

Figure 5:
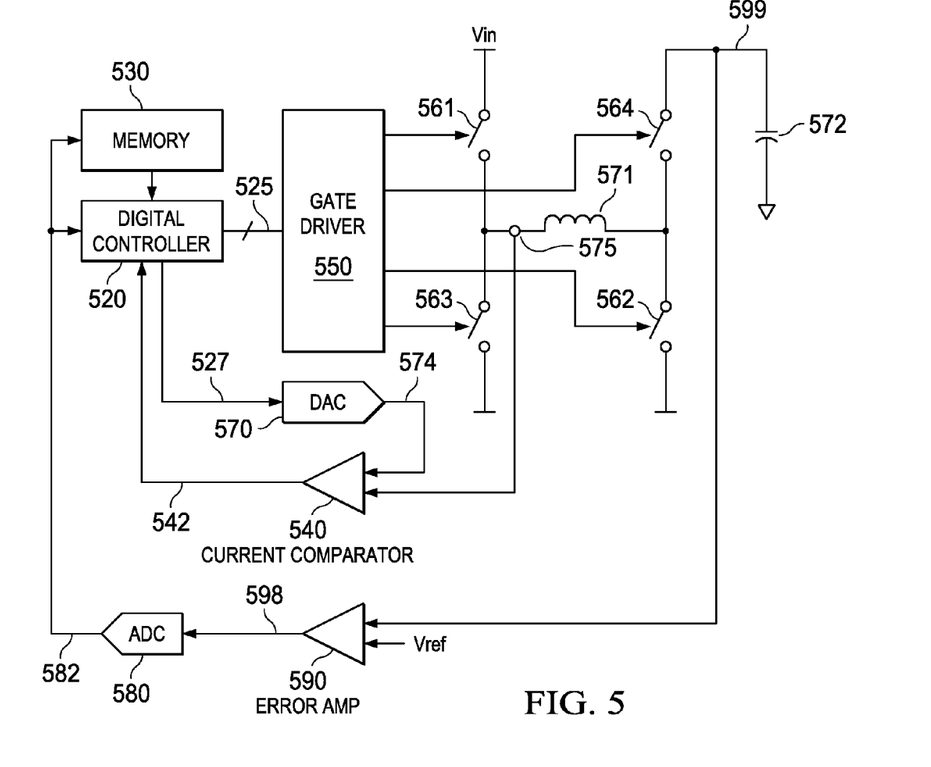
FIG. 5 is a block diagram illustrating the details of an example implementation of a current mode controlled switching regulator.

FIG. 5 is block diagram illustrating the details of a Buck-Boost converter (an example of a switching regulator) in an embodiment of present invention. The block diagram is shown containing digital controller 520, memory unit 530, current comparator 540, gate driver 550, ADC 580, error amplifier 590, digital to analog converter (DAC) 570, switches 561-564, inductor 571, capacitor 572, and current sensor 575. Each component is described below in further detail.

Error amplifier 590 receives present strength of the regulated output signal and a desired strength (Vref) on negative and positive terminal respectively. Difference of the two received signals are amplified and presented as present error signal to the ADC 580. ADC 580 provides a digital code corresponding to the strength of the error signal ("present error") received from the error amplifier 590. Memory unit 530 stores digital codes generated by ADC 580. Error amplifier 590, ADC 580 and memory unit 530 may respectively operate similar to error amplifier 470, ADC 480 and memory unit 430.

Digital control 520 generates a current signal (Iref) on path 527 in digital form and DAC 580 converts the digital signal to analog current signal. Current signal Iref is generated having strength proportionate to a desired strength to which inductor 572 requires to be charged for making correction. The desired strength of Iref may be determined, for example, according to the approach of FIG. 3 described above.

Current comparator 540 maintains a logic high on path 545 while the strength of Iref is greater than the current sampled on inductor 571, and maintains logic low while I ref is less than the current sensed on the inductor. Output of the current comparator is provided to digital controller 520 for generating control signal which operates switches 561-564 to make required correction.

Digital controller 520 sets control parameter at logic high while comparator output is at logic high and sets control signal value at logic low while comparator output is at logic low. Control signal is presented on path 525. The manner in which control parameter generated by digital controller operates switches 561-564 is described below in further detail.

Switches 561-564 and gate driver 550 together represents a power switch arrangement (akin to 240 of FIG. 2). Gate driver 550 turns on switches 561 and 562 if path 525 is at logic high and turns on switches 563 and 564 if path 525 is at logic low. Switches 561 and 562 are switched off if path 525 is at logic low and switches 563 and 564 are switched off if path 525 is at logic high.

Current in inductor 571 increases when switches 561 and 562 are closed thereby storing energy. Current in the inductor 571 decreases when switches 563 and 564 are closed thereby discharging the stored energy to the capacitor 572. The peak energy stored in inductor 571 depends on the duration for which switches 561 and 562 are closed (as well as the strength of current injected).

The energy discharged by inductor 571 in the form of current is reflected as voltage across capacitor 572, representing the desired regulated output signal. A decrease in output voltage occurs for various reasons such as decrease in input voltage (Vin) or increase in load. Such a decrease is corrected by charging the inductor 571 to a higher peak current (hence increasing the time duration of on period of switches 561 and 562) as described below.

When the output voltage on path 599 reduces, a positive value of the present error is generated (by error amplifier 590). Hence, digital controller 520 increments Iref to (Iref+step size) ("increased reference current"), and the equivalent current is provided on path 524. Comparator 540 maintains a logic high until inductor current reaches a value proportional to increased reference current.

Hence, inductor 571 stores extra energy corresponding to the increased reference current. When the inductor current reaches the value corresponding to (Iref+1step), the comparator output becomes logic low enabling inductor to discharge that extra energy to capacitor, resulting in an incremental increase in output voltage.

Similarly, when the output voltage on path 599 increases, digital controller 520 reduces Iref to (Iref−step size), causing the voltage level on path 599 to decrease. In the steady state, digital controller 520 may generate the same value of Iref in successive iterations to maintain the voltage at the same (desired) value. Even though the LC network of above is described with respect to a combination of a capacitor and an inductor, it should be appreciated that more complex combinations of these elements can be used to implement LC networks.

The concept can be extended to a switching regulator providing multiple regulated signal having different strength. An example implementation of switching regulator providing multiple regulated output is illustrated with a block diagram below

7. Example Multiple Output Switching Regulator

Figure 6:
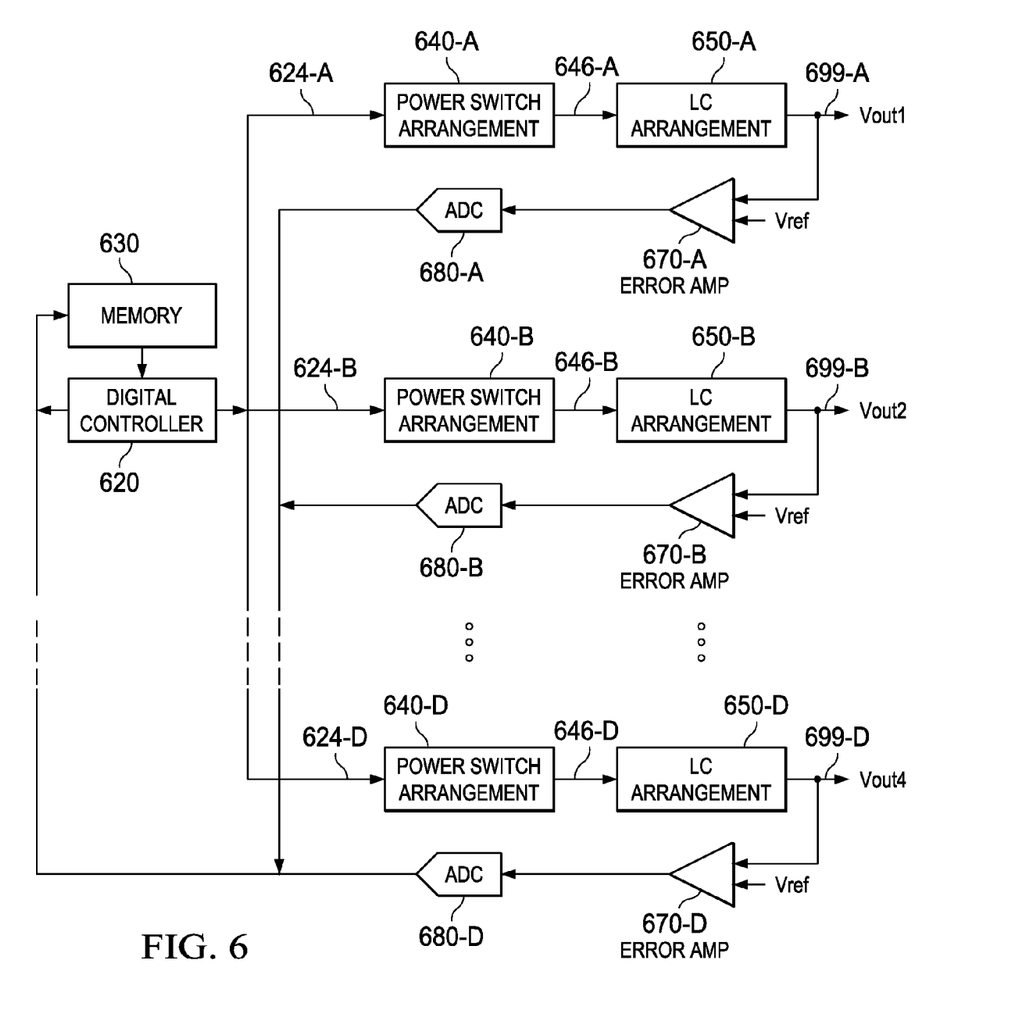
FIG. 6 is a block diagram illustrating the details of a switching regulator providing multiple regulated signals, implemented according to various aspects of present invention.

FIG. 6 is a block diagram illustrating the implementation of a switching regulator providing multiple regulated outputs according to an aspect of present invention. The block diagram is shown containing power switch arrangements 640A-640D, LC arrangements 650A-650D, Error amplifiers 670A-670D, ADCs 680A-680D, digital controller 620 and memory unit 630. Each component is described below in further detail.

Each of power switch arrangements 640A-640D receives a corresponding control signal from digital controller 620, and provides a respective switched input signal to corresponding LC arrangement 650A-650D. Each LC arrangement 650A-650-D generates a corresponding regulated output of different desired strength on respective paths 699A-699D.

Each of error amplifiers 670A-670D generates a corresponding error signal corresponding to regulated signals on path 699A-699D respectively. Each error amplifier 670A-670-D receives a corresponding reference signal (proportionate to the strength of the regulated voltage to be generated) and output generated by corresponding one of LC arrangements 650A-650D, and generate the error signals.

ADCs 680A-680D provide digital codes corresponding to respective error signals. Operation of power switch arrangements 640A-640D, LC arrangements 650A-650D Error amplifier 670A-670D, and ADC 680A-680D is respectively similar to operation of power switch arrangement 240, LC arrangement 260, error amplifier 270, and analog to digital converter (ADC) 280 described above.

Memory unit 630 stores digital codes received from ADCs 680A-680D along with corresponding index (index may represent the output path or path on which digital controller needs to provide control parameter).

Digital controller 620 generates control signals to power switch arrangements 640A-640D based on the digital codes stored in memory unit 630, control parameter $c_i$, and the digital codes received from ADCs 680A through 680D. Digital controller 620 may be implemented using the approaches described above with respect to digital controller 420.

As noted above, controller 220 can be implemented in digital or analog domains. The description above is provided with respect to digital domain. The description below is continued with respect to analog domain.

8. Analog Domain Implementation

Figure 7A:
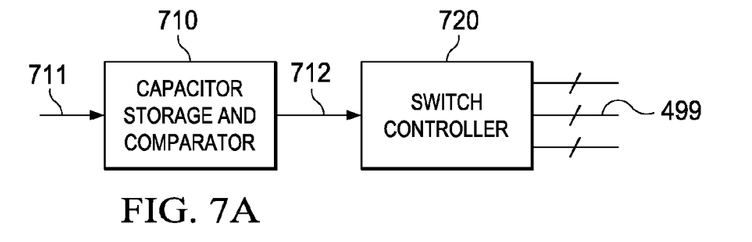
FIG. 7A is a block diagram illustrating portion of a controller implemented in analog domain.

FIG. 7A is a block diagram illustrating manner in which a portion of controller 220 can be implemented in analog domain. The block diagram is shown containing capacitor storage and comparator unit 710 and switch controller 720. Each block is described below in further detail.

Capacitor storage and comparator unit 710 generates a signal on path 712 representing the present error value and previous error value according to approach described in FIG. 3. The error value is received on path 711 from error amplifier 270. Switch controller 720 receives signal on path 712 and operates switches to provide regulated output signal. Manner in which capacitor storage and comparator unit 710 is implemented in analog domain is illustrated below with an example circuit.

Figure 7B:
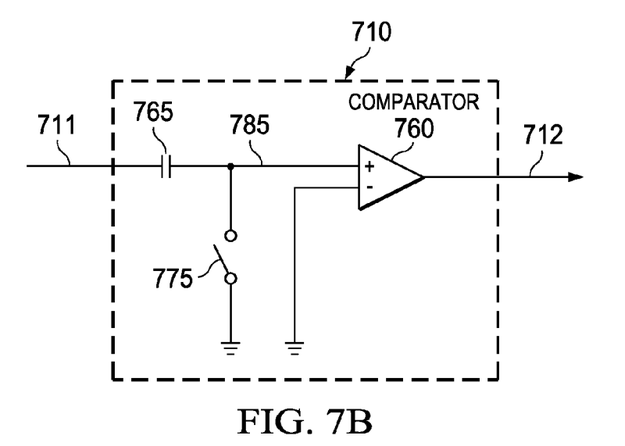
FIG. 7B is a block diagram illustrating the manner in which error values can be compared in analog domain.
Figure 8:
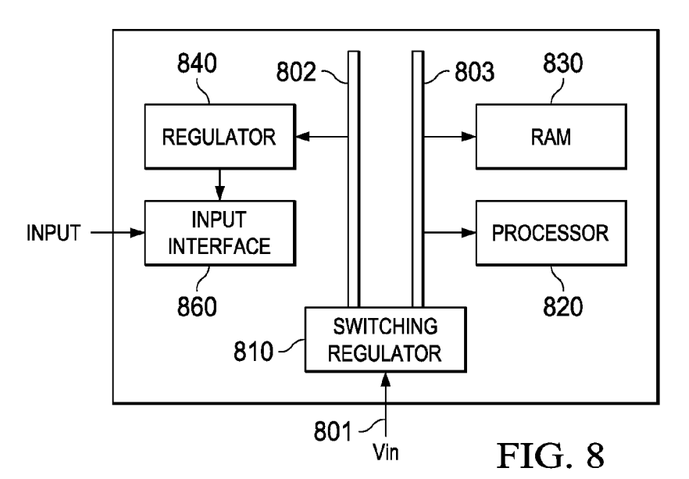
FIG. 8 is a block diagram of an example system in which various aspects of the present invention can be implemented.

FIG. 7B is an example circuit generating a signal on path 712 representing the present error value and and previous error value according to approach described in FIG. 3. The circuit is shown containing comparator 760, capacitor 765 and switch 775. The operation of each component is described below in further detail Capacitor 765 is charged to represent the value (e(i-1)) when switch 775 is closed (for a short duration). When switch 775 is then opened, the difference of present error value (e(i)) and e(i-1) appears at node 785. In that duration, comparator 760 generates a logic high when present error value is greater than previous error value and generates logic low when present error value is less than or equal to previous error value, since the inverting terminal of comparator 760 is connected to ground.

Thus, without having to convert the error signal to digital value, the comparison result can be generated in analog domain. Similarly, more portions of controller 220 can be implemented in analog domain. The controllers thus implemented can be used in various types of devices. The description is continued with respect to an example device in which various aspects of the present invention can be implemented.

7. System

FIG. 6 is a block diagram illustrating a system implemented according to an aspect of the present invention. The block diagram is shown containing switching regulator 610, processor 620, RAM 630, input interface 660 and regulator 640. It should be understood that only a few representative components are included for illustration. However, typical systems contain more components. In addition, the connections between the components (e.g., between 620 and 630) are not shown merely to avoid obscuring the features of the present invention. Each component is described below in further detail.

Switching regulator 610 generates regulated power supplies of different strengths (e.g., 3.3 V and 5V) on paths 602 and 603. Switching regulator 610 may be implemented using the approaches described above.

Processor 620 and random access memory (RAM) 630 operate using the regulated voltage provided on path 603. Input interface 660 may receive various input signals (e.g., an analog signal representing voice) on path 605 and generate the corresponding digital values. The digital values are stored in RAM 630 for further processing by processor 620. Such processing generally determines the various features provided to a user using the system of FIG. 6.

As shown, processor 620 and RAM 630 operate based on the input voltage received on path 603. Variations of the input voltage from the desired strength may corrupt the stored digital value, resulting in loss of data. Hence a desired constant voltage is generated by a switching regulator implemented according to approach described above.

Regulator 640 generates a reference voltage for input interface 660. Input interface 660 may contain components such as ADCs, which require constant reference voltage (potentially of a different level than that available on path 602), without which the data values generated by input interface 660 may be erroneous. Regulator 640 provides such constant voltage level.

From the above, it may be appreciated that various types of systems can be implemented according to various aspects of the present invention.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A switching regulator providing a constant output signal to an external circuit offering a load, said switching regulator comprising:

a first circuit containing a plurality of switches and receiving an input signal which is potentially unregulated, wherein said plurality of switches can be turned on and off with a duty cycle based on a control parameter, said first circuit providing said input signal as an intermediate signal at time durations specified by said duty cycle;

an impedance network providing an output signal by averaging the signal strength of said intermediate signal;

a comparator comparing the strength of said output signal with a first signal to generate an error value in each of a plurality of successive iterations, said first signal being proportionate to a desired strength of said constant output signal;

a controller controlling said control parameter in each iteration based on a plurality of error values generated by said comparator, wherein said plurality of error values comprise at least a present error value generated from a present iteration and a prior error value from an immediately preceding iteration, further wherein said control parameter being controlled to cause said impedance network to generate said constant output signal and an analog to digital converter (ADC) converting said prior error value and said present error value to a first digital code and a second digital code respectively, wherein said controller processes said first digital code and said second digital code to determine said control parameter;

wherein said controller is operable to:

set a temporary variable to a magnitude of said second digital code if said second digital code is greater than 0, and to 0 otherwise;

setting a step size proportionate to said temporary variable;

incrementing said duty cycle by said step size if said second digital code is greater than or equal to said first digital code, and maintain the same value for said duty cycle otherwise; and decrement said duty cycle by said step size if said temporary variable equals 0.

2. The switching regulator of claim 1 further comprising: a memory storing said first digital code.

3. The switching regulator of claim 2, wherein said control parameter comprises a digital value representing a duty cycle, said switching regulator further comprising:

a digital to analog converter (DAC) converting said digital value to a first current;

a current comparator comparing said first current with a sensed current sensed from said impedance network; and a gate driver turning on or off said switches under the control of said controller, wherein said controller controls said gate driver to cause said first current equal to said sensed current.

4. The switching regulator of claim 1 wherein each of said present error value and a prior error value are compared in an analog domain, and a result of the comparison is used in generating said duty cycle.

5. The switching regulator of claim 1 wherein each of said present error value and a prior error value are compared in an analog domain, and a result of the comparison is used in generating a reference current used to determine said duty cycle.

6. A method of generating a constant regulated output, said method comprising:
- generating an output signal based on an unregulated signal, wherein a strength of said output signal is controlled by switching on or off a plurality of switches;
- comparing a present output sample with a desired strength to generate an error value in each of a plurality of successive iterations;
- determining a control parameter based on a plurality of error values generated by said comparing, wherein said plurality of error values comprise at least a
- present error value generated from a present iteration and a prior error value generated from an immediately preceding iteration;
- controlling said control parameter in each iteration based on a plurality of error values generated;
- turning said plurality of switches according to a value of said control parameter, wherein said control parameter is generated accurately due to the use of said plurality of error values,
- converting said prior error value and said present error value to a first digital code and a second digital code respectively;
- setting a temporary variable to a magnitude of said second digital code if said second digital code is greater than 0, and to 0 otherwise;
- setting a step size proportionate to said temporary variable;
- incrementing said duty cycle by said step size if said second digital code is greater than or equal to said first digital code, and maintain the same value for said duty cycle otherwise; and
- decrementing said duty cycle by said step size if said temporary variable equals 0.

7. A system comprising:
- a plurality of components requiring a constant output signal of desired strength;
- a switch mode regulator providing said constant output signal, said switch mode regulator comprising;
- a first circuit containing a plurality of switches and receiving an input signal which is potentially unregulated, wherein said plurality of switches can be turned on and off based on a control parameter, said first circuit providing said input signal as an intermediate signal at time durations specified by said duty cycle;
- an impedance network providing an output signal by averaging the signal strength of said intermediate signal;
- a comparator comparing the strength of said output signal with a first signal to generate an error value in each of a plurality of successive iterations, said first signal being proportionate to a desired strength of said constant output signal;
- a controller controlling said control parameter in each iteration based on a plurality of error values generated by said comparator, wherein said plurality of error values comprising at least a present error value generated from a present iteration and a prior error value from an immediately preceding iteration, said control parameter being controlled to cause said impedance network to generate said constant output signal and, wherein said controller is operable to:
- set a temporary variable to a magnitude of said second digital code if said second digital code is greater than 0, and to 0 otherwise;
- setting a step size proportionate to said temporary variable;
- incrementing said duty cycle by said step size if said second digital code is greater than or equal to said first digital code, and maintain the same value for said duty cycle otherwise; and
- decrement said duty cycle by said step size if said temporary variable equals 0.

8. The system of claim 7, further comprising:
a memory storing said first digital code.

9. The system of claim 8, wherein said control parameter comprises a digital value representing a duty cycle, said switching regulator further comprising:
- a digital to analog converter (DAC) converting said digital value to a first current;
- a current comparator comparing said first current with a sensed current sensed from said impedance network; and
- a gate driver turning on or off said switches under the control of said controller, wherein said controller controls said gate driver to cause said first current equal to said sensed current.

10. The system of claim 7, wherein each of said present error value and a prior error value are compared in an analog domain, and a result of the comparison is used in generated said duty cycle.

* * * * *